United States Patent [19]

McDuffee

[11] Patent Number: 6,002,945
[45] Date of Patent: Dec. 14, 1999

[54] COMBINATION PAGER AND CELLULAR TELEPHONE HAVING EXTENSIBLE, FLEXIBLE MOUTHPIECE

[76] Inventor: Dennis McDuffee, 970 Dean Dr., Gardnerville, Nev. 89410

[21] Appl. No.: 08/851,098

[22] Filed: May 5, 1997

[51] Int. Cl.⁶ .................................................. H04Q 7/20
[52] U.S. Cl. .............................. 455/556; 455/575; 455/90
[58] Field of Search ....................................... 455/552, 556, 455/575, 566, 569, 90, 351, 350; 379/433, 440, 445

[56] References Cited

U.S. PATENT DOCUMENTS

| | | | |
|---|---|---|---|
| 585,807 | 1/1897 | Masood | 455/575 |
| 5,117,449 | 5/1992 | Metroka et al. | 455/552 |
| 5,148,473 | 9/1992 | Freeland et al. | 455/556 |
| 5,151,196 | 9/1992 | Martensson | 455/90 |
| 5,241,583 | 8/1993 | Martensson | 455/565 |
| 5,247,700 | 9/1993 | Wohl et al. | 455/552 |
| 5,307,401 | 4/1994 | Matsuda . | |
| 5,333,176 | 7/1994 | Burke et al. . | |
| 5,369,788 | 11/1994 | Nagai | 455/90 |
| 5,475,752 | 12/1995 | Mischenko . | |
| 5,588,041 | 12/1996 | Meyer, Jr. et al. . | |
| 5,701,337 | 12/1997 | Silver et al. | 455/343 |

*Primary Examiner*—Edward F. Urban
*Assistant Examiner*—Tilahun Gesesse
*Attorney, Agent, or Firm*—Terrance L. Siemens

[57] ABSTRACT

The present invention features a radio frequency two-way electronic communications device incorporating the features of both a mobile pager and a cellular telephone. The combined mobile pager and cellular phone is packaged in a miniature, rectangular package similar to a standard mobile pager. The package, which may be clipped to a user's belt, features a top display for ease of viewing while the device is in its intended position on a user's belt. A single transducer functions a both an earphone and as a speaker allowing for a speakerphone mode of operation. A flexible, slidable mouthpiece extension to which a thin microphone is attached, is normally stored within the package. An accessible switch selects one of the modes of annunciation: ringing, beeping, or vibrating. Recessed buttons on the face of the package provide both control and dialing functions. The antenna for receiving and transmitting for both the pager and telephone functions is self-contained.

13 Claims, 3 Drawing Sheets

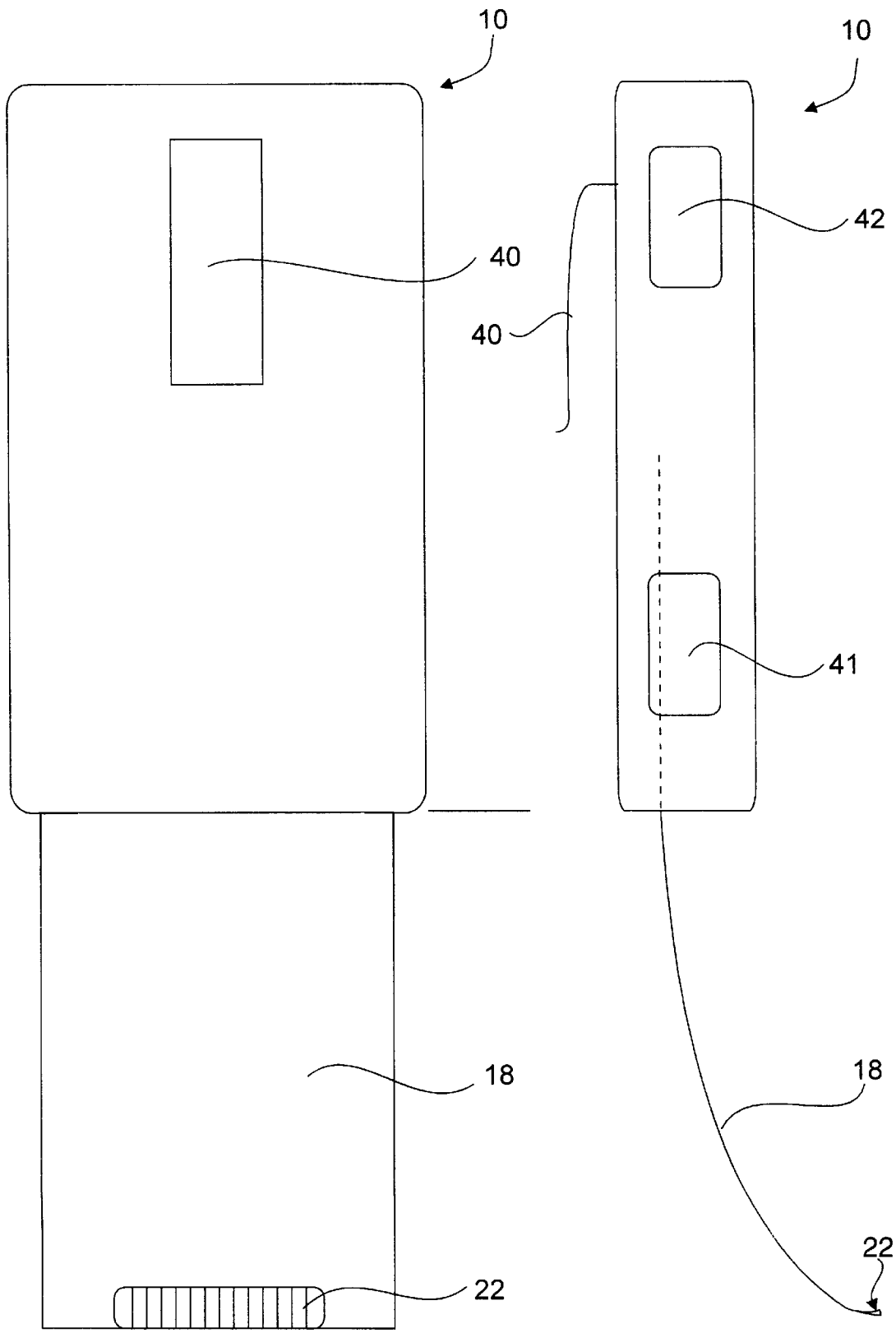

COMBINATION PAGER AND CELLULAR TELEPHONE HAVING EXTENSIBLE, FLEXIBLE MOUTHPIECE

FIELD OF THE INVENTION

The present invention relates to a combination cellular phone and mobile pager, and more particularly, to a small, easily transported, multi-use communications device containing all the features of state-of-the-art cellular telephones and mobile pagers.

BACKGROUND OF THE INVENTION

Discussion of the Prior Art

Both cellular telephones and mobile pagers are widely used today, each serving a particular purpose. Cellular telephones allow a two-way voice/data interface to the international wired/wireless telephone network. Mobile pagers or "beepers" are generally considered one-way communication devices alerting a user by means of either a short voice message, or more often, short, digitally-transmitted text displayed by the pager. While the cost of a cellular telephone itself has fallen drastically during the last several years, the cost of the necessary air time to use the phone remains fairly expensive. Users pay for air time both for originated and received calls. Because a user has no control over received calls, valuable air time may be wasted on trivial calls. Pagers on the other hand, are not only inexpensive to own but, because of their limited communication ability, require far less air time and are, therefore, much less expensive to operate. A user having received a message on his or her pager has the option of whether or not to return a call to the paging party. Both cellular phones and mobile pagers have found its nitch in the mobile communications environment, each performing their specialized function. As mobile communication becomes more and more commonplace, especially in the professional and business communities, many users are feeling the need for both a cellular phone and a mobile pager. This creates a number of problems. First, the user must purchase and maintain two pieces of electronic equipment which, by their very nature, are subject to damage and loss. The carrying of two pieces of electronic equipment on the user's person is also not without problems. The user must also subscribe to two different communications services, probably necessitating paying two monthly bills.

U.S. Pat. No. 5,247,700 for CELLULAR TELEPHONE WITH PAGER; issued Sep. 21, 1993 to James P. Whol, et al. Whol, et al. teach a conventional cellular telephone package which also contains certain pager facilities. In contradistinction, the combination cellular phone and pager of the present invention is packaged more like a conventional pager. A microphone, affixed to a thin, flexible member, is stored safely inside the housing. This mouthpiece is spring-loaded, for easy extension or retraction. A single transducer functions as both an ear phone and a speaker for a hands-free, speakerphone mode of operation. Unlike the Wohl, et al. apparatus, an external switch allows for selecting between audible and non-audible alert modes. This allows the discreet use of the inventive device in concert halls, theaters or the like when an audible alert might be distracting to other persons. Also, unlike the Wohl, et al. device, the inventive cellular phone/pager features a top-mounted liquid crystal display panel for ease of viewing when the worn on the belt like a conventional pager.

U.S. Pat. No. 5,336,176 for CELLULAR HAND HELP PORTABLE SPEAKERPHONE SYSTEM HAVING AN INTERFACE ADAPTER; issued Jul. 26, 1994 to Timothy M. Burke, et al. features a conventionally packaged cellular phone. The Burke et al. phone has a normal earphone and a separate speaker for hands-free operation. The Burke et al. phone may be cradle-mounted for desk or vehicle use, and there us no combination of mobile pager and cellular telephone functions taught. On the other hand, the combination cellular phone and pager of the present invention features a combined earphone and speaker. The small size of the inventive apparatus also precludes the need for cradle mounting as it may easily be hand-held during use, even use as a speaker phone.

Another cellular telephone adapted for speakerphone operation is taught in U.S. Pat. No. 5,588,041; issued Dec. 24, 1996 to George W. Meyer Jr., et al. The Meyer et al. system utilizes external accessories connected to the phone for the speakerphone mode of operation. In contradistinction, the inventive apparatus requires no external accessories to accomplish speakerphone operation. Also, the inventive apparatus is much more compact than that taught by Meyer et al. allowing for ease of use and portability unavailable in the Meyer et al. unit. Finally, the Meyer et al. unit does not combine the functions of a mobile pager and a cellular telephone into one package.

U.S. Pat. No. 5,307,401 for CELLULAR TELEPHONE WITH MICROPHONE EXTENSION; issued Apr. 26, 1994 to Hari Matsuda teaches a hand-held, portable cellular telephone. An rigidly affixed optional add-on portion containing an additional microphone may be attached to a lower portion of the telephone body. Preferably, when this optional add-on portion is affixed, the original microphone located within the hcusing of the cellular telephone is de-activated. No mobile pager or speakerphone functions are included in the Matsuda apparatus. Unlike the Matsuda phone, the inventive combination mobile pager and cellular phone features a single microphone and an extensible, flexible extension to enhance the microphone's pick-up of a user's voice. The inventive apparatus also features a speakerphone mode of operation. The antenna function of the inventive apparatus is totally self-contained unlike the retractable, external antenna of the Matsuda phone.

Another cellular phone having a microphone extension function is taught in U.S. Pat. No. 5,475,752 for POR-TABLE TELEPHONE AND) SUPPORT MECHANISM THEREFOR; issued Dec. 12, 1995 to Nicholas Mischenko. The Mischenko phone features a body construction often referred in the art as a "flip phone". A hinged portion serves as a protective cover for the buttons and display of the phone when in a closed position. In an open position, the cover acts as an acoustic reflector and baffle directing a users' voice toward the microphone contained within the phone's body. A retractable, external antenna is used. No mobile pager or speakerphone functions are incorporated. In contradistinction, the inventive combination mobile pager and cellular phone features a flexible, non-hinged microphone extension much less easily damaged than the rigid, hinged microphone extension as taught by Mischenko. In addition, the inventive apparatus features a mobile paging and speakerphone function as well as a totally self-contained antenna.

It is therefore an object of the present invention to provide a portable communications device containing the functions of a conventional mobile pager and a cellular telephone.

It is another object of the invention to provide the aforementioned function in a small package of a rectangular parallelepiped form factor adapted for attachment to a user's belt by means of an integral belt clip.

It is yet another object of the invention to provided a combination mobile pager and cellular telephone whose antenna function is totally contained within the package.

It is a further object of the invention to provide an apparatus with a single transducer function both as an ear phone or as a speaker for a speakerphone mode of operation.

It is another object of the invention to provide a combined mobile pager and cellular telephone with user-selectable annunciation selectable between a ringing mode, a beeping mode and a vibrating mode.

SUMMARY OF THE INVENTION

The present invention features a radio frequency two-way electronic communications device incorporating the features of both a mobile pager and a cellular telephone. The combined mobile pager and cellular phone is packaged in a miniature, rectangular package similar to a standard mobile pager. The package, which may be clipped to a user's belt, features a top display for ease of viewing while the device is in its intended position on a user's belt. A single transducer functions a both an earphone and as a speaker allowing for a speakerphone mode of operation. A flexible, slidable mouthpiece extension to which a thin microphone is attached, is normally stored within the package. An accessible switch selects one of the modes of annunciation: ringing, beeping, or vibrating. Recessed buttons on the face of the package provide both control and dialing functions. The antenna for receiving and transmitting for both the pager and telephone functions is self-contained.

BRIEF DESCRIPTION OF THE DRAWINGS

A complete understanding of the present invention may be obtained by reference to the accompanying drawings, when taken in conjunction with the detail description thereof and in which:

FIG. 2 is a rear view of the combined pager and cellular phone with the mouthpiece extension in an extended position;

FIG. 3 is a side view of the combined pager and cellular phone with the mouthpiece extension in an extended position;

DESCRIPTION OF THE PREFERRED EMBODIMENT

The present invention relates to a radio frequency two-way electronic communications device incorporating the features of both a mobile pager and a cellular telephone. More particularly, the present invention is a mobile pager and cellular phone is packaged in a miniature, rectangular package similar to a standard mobile pager.

Figure 1:
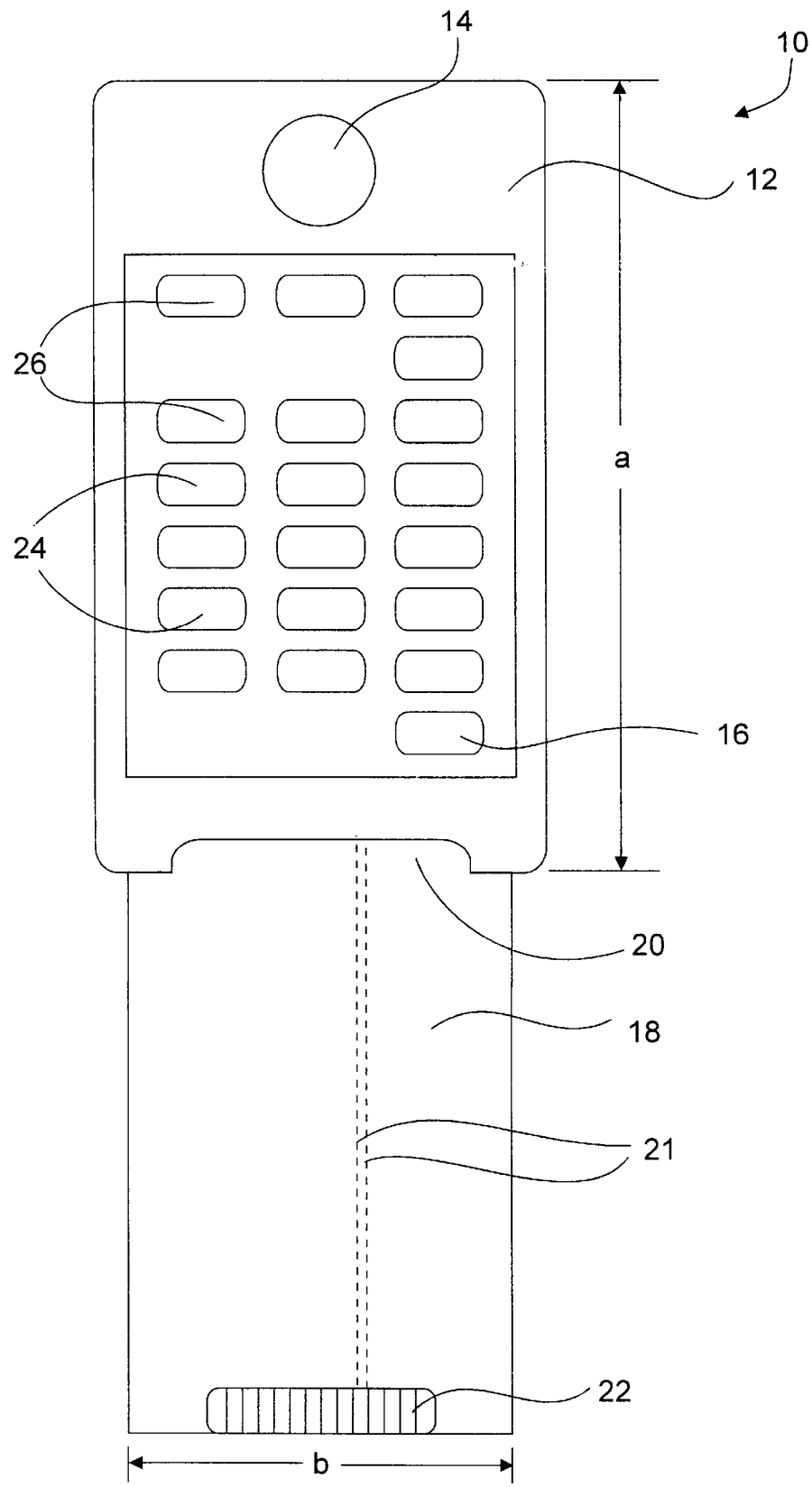
FIG. 1 is a front view of the combined pager and cellular phone with the mouthpiece extension in an extended position.

Referring first to FIG. 1, there is shown a front plan view of the inventive pager/phone, reference number 10. A rectangular case 12 houses all of the electronic componentry necessary to achieve the required communications functions. In the preferred embodiment, the dimensions of case 12 are approximately 3.75 inches high (dimension "a"), 2.25 inches wide (dimension "b"), and approximately 0.625 inch thick (not shown). An audio transducer 14 is located proximate the top edge of the case. In the preferred embodiment, transducer 14 is an electromagnetic element such as a 2.25 inch diameter speaker provided by Radio Shack as catalog number 40–246. The transducer serves as both an earphone when the combined pager/phone is held at a user's ear in a normal telephone-type posture, and as a speaker when the combined pager/phone is in a speakerphone mode of operation. A dedicated push button type switch 16 allows a user to select between normal phone mode and speaker phone mode. Button 16 is shown proximate the lower right corner of the front face of the phone. It should be obvious that the function of button 16 could be performed in a variety of ways well known to those skilled in the art; or that button 16 could be located in any convenient place on case 10 of the inventive pager/phone. A retractable, flexible mouthpiece extension 18 is shown extended from case 10. Extension 18 may be a multi-layer strip of MYLAR(™). A thin microphone cartridge 22 is disposed inside mouthpiece extension 18. The microphone is generally a thin, self-polarizing electret element well known to those skilled in the art and commonly used in hand-held telephone applications. Special amplification circuitry (not shown) is provided to provide the sensitivity necessary for hands-free operation. Thin, flexible electrical connectors 21 embedded between the layers of extension 18 provide electrical connection to the internal circuitry of pager/phone 10. Location of the microphone is such that even when retracted there is ample acoustical pickup so that pager/phone 10 may be used in a hands-free, speakerphone mode. A safety feature automatically limits the output volume of transducer 14 when extension 18 is extended from body 12 and the unit is in a normal, not hands-free operation mode. A recess 20 in case 12 provides access so that extension 18 may be grasped and pulled out from within case 12. Corrugations surrounding microphone 22 at the far end of mouthpiece extension 18 provides a gripping surface to facilitate the grasping of mouthpiece extension 18 when it is fully retracted into case 10. Extension 18 is spring loaded to facilitate its retraction into case 12. A release 41 (FIG. 3) on the side of case 12 retracts extension 18. A switch (not shown) internal to pager/telephone 10 senses when flexible extension in extended or retracted and may be used for various functions such as power control, automatic mode switching, or the volume-limiting safety function. A series of conventional telephone buttons 24 are disposed in a conventional arrangement on the face of case 12. Additional buttons 26 for performing special control functions not associated with dialing a phone number are also located on the face of case 12. The functions of these special control buttons will be discussed in more detail hereinbelow. Buttons 24 and 26 are recessed below the frontmost plane of case 12 to minimize accidental depression. In alternate embodiments of the combination pager/phone, buttons 24 and 26 may be illuminated when depressed.

Referring now to FIG. 2 there is shown a rear view of the combination mobile pager and cellular telephone 10. A clip 40 is provided to attachment of pager/phone 10 to a user's belt or the like. Clip 40 may be formed and attached in a variety of ways well known to those of skill in the art. Mouthpiece extension 18 is again shown extended from within case 12. Phantom lines 42 indicate the approximate position of mouthpiece extension 18 when is fully stowed within case 12.

Referring now to FIG. 3 there is shown a side view of the combination mobile pager and cellular telephone of the invention 10. The curvature of mouthpiece extension 18 may be more fully comprehended in this view. The illustrated curvature is optimized to assure maximum pickup of the user's voice and to excluded as much background noise as possible when the apparatus is used in a normal, hand-help telephone mode. A release mechanism 41 controls retraction of extension 18 into case 12. A slide switch 42 selects among the three available annunciation modes; ring, beep, or vibrate.

Figure 4:
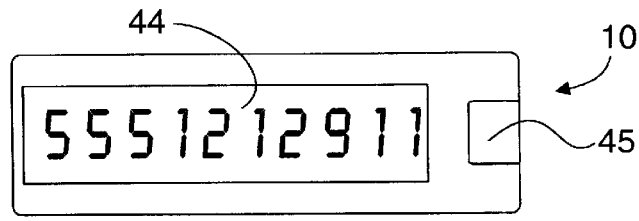
FIG. 4 is a top view of the combined pager and cellular phone.

Referring now to FIG. 4 there is shown a top view of the combination mobile pager and cellular telephone 10. A display panel 44 is disposed on the top of case 12. Display panel 44 is normally an LCD panel however any other suitable technology may be employed to implement the display. The position of panel 44 atop case 12 allows easy viewing of the display by a user when pager/phone 10 is clipped to a user's belt. A push button switch 45 proximate display 44 allows scrolling through multiple messages or may perform any other suitable function associated with a mobile pager or cellular telephone display.

Figure 5:
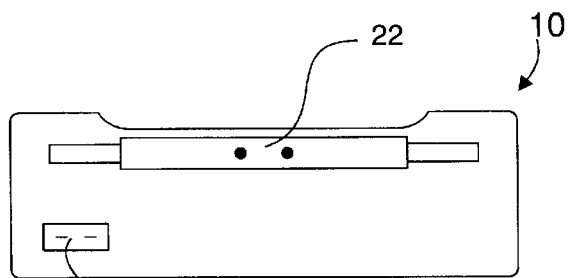
FIG. 5 is a bottom view of he combined pager and cellular phone.
Figure 6:
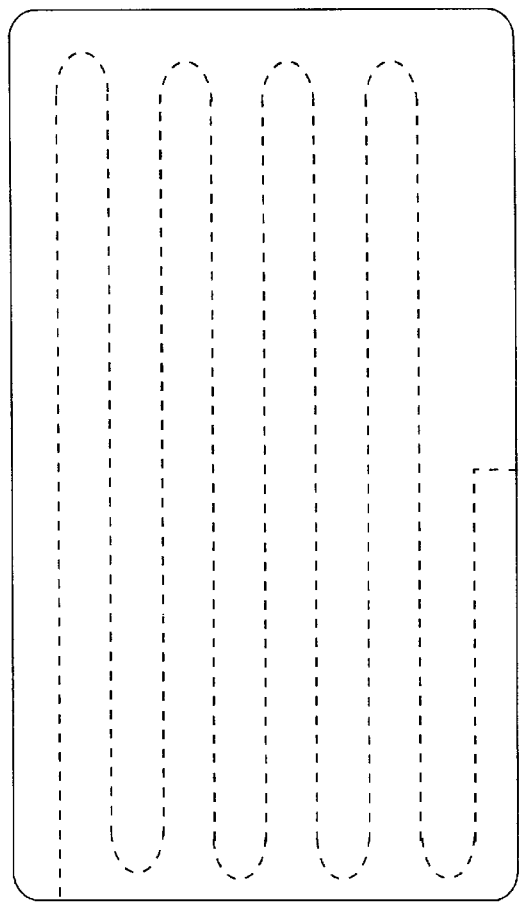
FIG. 6 is a schematic representation of the antenna contained within the combined pager and cellular phone.

Referring now to FIG. 5 there is shown a bottom view of the combination mobile pager and cellular telephone 10. A socket 46 is provided to connecting pager/telephone 10 to a charger or to an external power source such as a vehicle battery.

Referring now to FIG. 7, there is shown a schematic representation of the internal antenna 48 employed by the combination mobile pager and cellular telephone. If possible, a single antenna is preferred. Because typical paging services generally utilize transmission frequencies in the 150 MHz range awhile cellular telephone services occupy frequencies in the 800–900 MHz range, plural antennas (not shown) may be needed for some operating environments. The plural antennas could be interleaved, each antenna being adjusted to the proper length for optimal operation at its desired operating frequency. Antenna 48 may be molded into or permanently fasted to the back portion of case 12 (FIG. 1).

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. An electronic communications device comprising a combination mobile pager and cellular telephone having the features of both a mobile pager and a cellular telephone, comprising:

an essentially rectangular case having a front surface, a rear surface, a top surface, a bottom surface, a left side surface and a right side surface;

an earphone disposed within said case proximate said top edge of said front surface;

a plurality of button switches disposed on said front surface; and a retractable, flexible mouthpiece extension bearing a microphone; wherein said mouthpiece extension is slidably movable between a first, stored position wherein said microphone is completely enclosed within said case, and a second, extended position wherein said microphone is outside said case; and said mouthpiece extension is curved when in said second, extended position.

2. The combination mobile pager and cellular telephone as recited in claim 1, further comprising ac least one antenna contained within said case.

3. The combination mobile pager and cellular telephone as recited in claim 1, further comprising a display proximate said top surface.

4. The combination mobile pager and cellular telephone as recited in claim 1, wherein said plurality of button switches further comprise operating surfaces designed to be contacted by a finger, said operating surfaces being disposed in a plane parallel to said front surface, said plane being recessed behind said front surface.

5. The combination mobile pager and cellular telephone as recited in claim 1, wherein said flexible mouthpiece extension comprises at least two layers of non-conductive polymer material.

6. The combination mobile pager and cellular telephone as recited in claim 5, wherein said at least two layers of non-conductive polymer material comprise mylar®.

7. The combination mobile pager and cellular telephone as recited in claim 5, further comprising at least one electrical conductor.

8. The combination mobile pager and cellular telephone as recited in claim 7, wherein said microphone comprises a self-polarizing, electret microphone.

9. An electronic communications device comprising a combination mobile pager and cellular telephone having the features of both a mobile pager and a cellular telephone, comprising:

an essentially rectangular case having a front surface, a rear surface, a too surface, a bottom surface, a left side surface and a right side surface;

an earphone disposed within said case proximate said top edge of said front surface;

a plurality of button switches disposed on said front surface;

an extendable microphone slidably movable between a first, stored position wherein said microphone is completely enclosed within said case, and a second, extended position wherein said microphone is outside said case, said combination mobile namer and cellular telephone further comprising at least one antenna contained within said case and a display proximate said ton surface, wherein said plurality of button switches further comprise operating surfaces designed to be contacted by a finger, said operating surfaces being disposed in a plane parallel to said front surface, said plane being recessed behind said front surface, and said earphone comprises a low-level acoustical output mode and a high-level acoustical output mode.

10. The combination mobile pager and cellular telephone as recited in claim 9, wherein said low-level acoustical output mode and said high-level acoustical output mode are user-selectable.

11. The combination mobile pager and cellular telephone as recited in claim 9, wherein said low-level acoustical output mode and said high-level acoustical output mode are automatically selected such that said high-level acoustical output mode is selected when said extendable microphone is in said first stored position, and said low-level acoustical output mode is selected when said extendable microphone is in said second, extended position.

12. The combination mobile pager and cellular telephone as recited in claim 9, wherein said plurality of button switches are illuminated when said switches are depressed.

13. The combination mobile pager and cellular telephone as recited in claim 9, further comprising a standby mode of operation, said standby mode of operation being controlled by a switch activated by said extendable microphone such that when said extendable microphone is moved from said second, extended position to said first, stored position, said standby mode of operation is initiated.

* * * * *